Feb. 22, 1966  C. J. STALEGO ETAL  3,236,616
METHOD FOR PRODUCING CURLED FIBERS
Filed July 24, 1961  2 Sheets-Sheet 1

INVENTOR.
CHARLES J. STALEGO &
BY  HAROLD E. LEAMAN

ATTORNEYS

Feb. 22, 1966 C. J. STALEGO ETAL 3,236,616
METHOD FOR PRODUCING CURLED FIBERS
Filed July 24, 1961 2 Sheets-Sheet 2

INVENTOR.
CHARLES J. STALEGO
BY & HAROLD E. LEAMAN

ATTORNEYS 3,236,616
METHOD FOR PRODUCING CURLED FIBERS
Charles J. Stalego and Harold E. Leaman, Newark, Ohio, assignors to Owens-Corning Fiberglas Corporation, a corporation of Delaware
Filed July 24, 1961, Ser. No. 126,279
4 Claims. (Cl. 65—5)

This invention relates to the production of glass fibers and more particularly to the manufacture of curly glass fibers.

Glass fibers when combined to form a fibrous wool, have found many uses a few of which are as thermal or sound insulating materials, as a cushioning material, and as a filtering media. For this type of application the individual glass fibers are collected together as a large mat and are bonded together with a suitable organic resin. For many applications such as insulation and as a filtering media it is necessary that the glass fiber mat be quite resilient and have good integrity. It has been found that curled glass fibers impart a greater resilienncy and integrity to a mat than straight glass fibers of the type produced by most fiberizing processes. The tortuous configuration of the individual curly fibers provides a mat made up of many fibers in mechanical interlocking relationship thereby providing this improved integrity and resiliency.

One process for producing mats of glass fibers utilizes gaseous blasts to attenuate streams of molten glass into fine fibers. The molten glass in fiber forming condition flows in streams from a feeder. The gases flowing from a blower positioned beneath the feeder entrain these streams of molten glass and attenuate them into fine fibers. Normally these fibers are carried directly downward by the attenuating gases to a suitable collection zone. It has been found that curled fibers can be produced by utilizing a plate or other curling surface suitably positioned beneath the blower in the path of the attenuating gases and entrained fibers to retard the forward movement of the fibers and sharply redirect them and impart a curling force thereto.

It is an object of this invention to provide a process for producing curly fibers.

A further object of this invention is to provide a process for producing a mat containing glass fibers having various degrees of curl.

Another object of this invention is to provide a process wherein the amount of curl imparted to the individual fibers is regulated to provide mats having optimum properties for particular predetermined end uses.

A further object of this invention is to produce discontinuous curly fibers.

Another object of this invention is to curl fibers that have been attenuated with a gaseous blast.

Another object of this invention is to provide a process for producing gas attenuated fibers with a tighter curl than heretofore possible.

Other objects and advantages of this invention will become apparent when reference is made to the following description and drawings in which.

Figure 1:
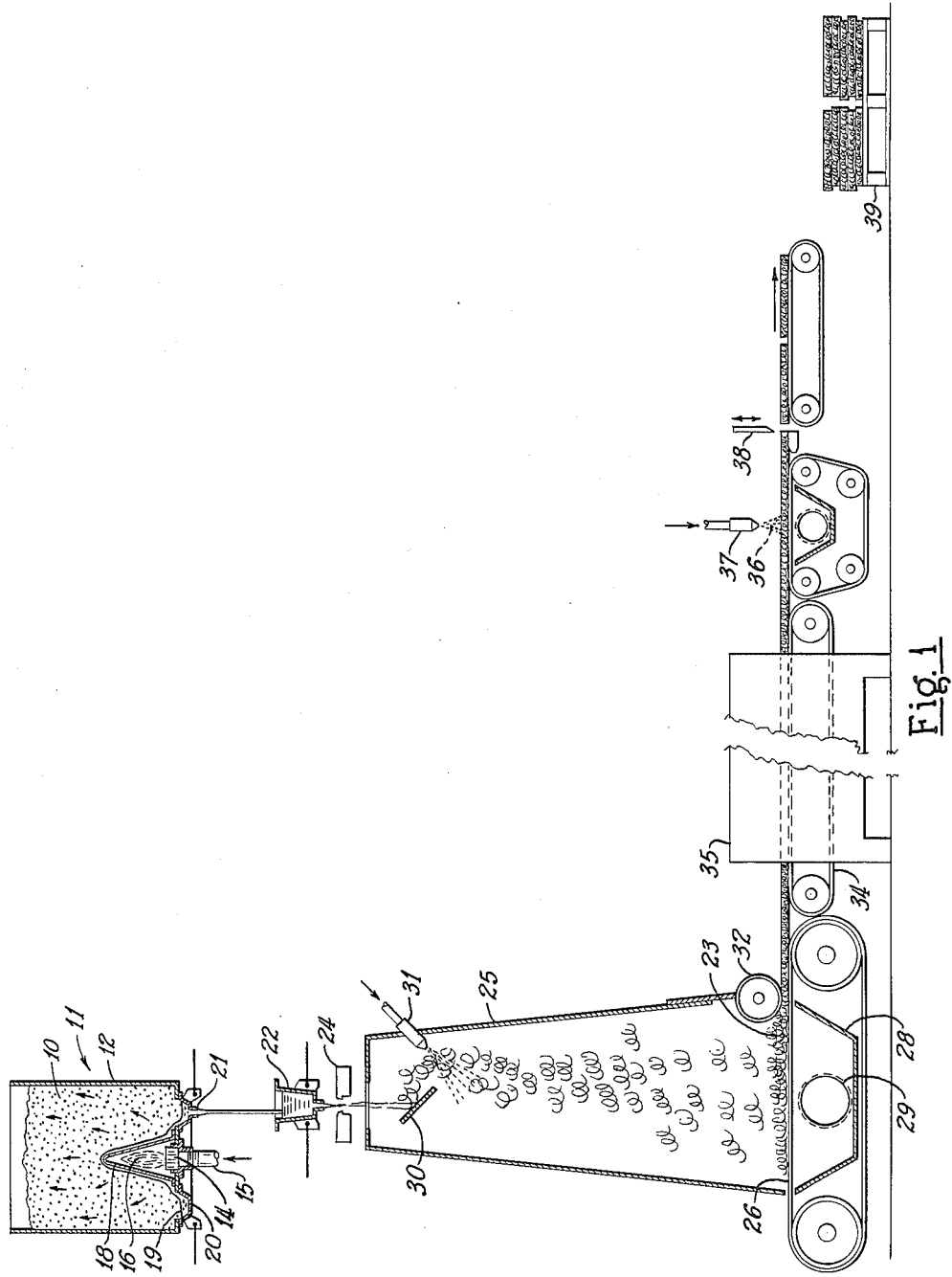
FIGURE 1 is a side elevational view of a process for producing curly fibers and a mat from these fibers.

Referring in greater detail to FIGURE 1, the glass constituents or batch materials 10 are mixed in the desired proportions in a dry mixer. The premixed batch materials are then placed in a suitable melting container 11. The particulars of the construction of the melting container depend upon the batch composition and the temperatures utilized in the particular process. A typical melting container is constructed with an outer sheath 12 that is generally made of metal or a suitable refractory fire brick. Located within the sheath 12 and near its bottom is a gas burner 14 to which fuel is supplied through a suitable heat resistant hose 15. This burner is positioned so that the flame therefrom is directed upward and into the batch materials 10. The burner flame 16 contacts and heats the batch materials located thereabove thereby melting them and converting them to molten glass. It is often desirable to position an arcuate screen 18 of a high temperature material such as a refractory of platium above the burner to prevent the collapse of the batch materials onto the burner and a consequent extinguishing of the melting flame. Besides the heating of the batch constituents directed by the flame the exhaust gases therefrom pass upwardly through the batch materials, losing a good percentage of their heat to the batch and preheating it, thereby increasing the overall thermal melting efficiency of the melter. Further increases in the overall thermal melting efficiency of this unit can be obtained by utilizing a manifold (not shown) extending around the outer surface of the sheath 12. The incoming gases for the burner are preheated by passing them through this manifold wherein they absorb heat from the sheath which normally be radiated into the surrounding room and wasted. Further, this flow of gas adjacent the sheath 12 maintains it at a lower temperature thereby permitting the use of lower temperature, less costly materials.

As the batch materials melt the glass forms and flows over the melting batch into a collecting trough 20. When a supporting framework such as a platinum screen 18 is installed above the burner the molten glass will be transported by this screen as a thin film to the collecting trough. This thin film of molten glass will be subjected to the direct flame from the burner and will be well refined when it flows into the collecting trough. This collecting trough is generally a suitable V-shaped structure made from platinum or other high temperature materials and is electrically heated to prevent cooling of the glass therein. This entire melting unit may be of a small circular shape with a single burner if it is used to supply glass to a relatively low volume operation and if greater melting capacity is needed it may be constructed as a rectangular trough with a series of burners located in the center of the bottom of the trough.

Glass in the collecting trough 20 flows to a drain orifice 21 and downward therefrom into a shallow electrically heated feeder 22. By using a suitable standpipe for the glass to flow through from the collecting trough 20 to the feeder 22 the entrainment of air consequent foaming or frothing of the glass in the feeder can be substantially reduced or eliminated. The glass flows downward from the feeder through a series of orifices located in the bottom thereof. As the glass flows from the orifices it is caught or entrained by streams of high velocity gases passing by it. These gases grasp the glass and extend and attenuate it into fibers having very small diameters. The diameter of these fibers is regulated by the temperature at which the glass flows from the orifices in the feeder, the size of the orifices in the feeder and the rate at which it is attenuated by the rapidly moving gases flowing thereover. A common method for supplying the high velocity gases for attenuating the glass into fibers is to utilize a pair of steam or air blowers 24 that are constructed so that the gases escaping therefrom flow downward in a slightly converging path. The gases from these blowers flow over the surface of the glass falling from the feeder and attenuates it to form the fibers. These fibers then flow downward into a collecting hood 25 and are gathered together in the form of a loose fibrous mat 23 on a suitable collecting surface such as a foraminous wire conveyor 26. The amount of turbulence in the hood and consequently the uniformity of the distribution of the collected fibers on the conveyor can be reduced by withdrawing gases from the collecting hood through the forming conveyor by maintaining a region of negative pressure in a plenum chamber 28 located below the forming conveyor. This negative pressure in the plenum chamber is maintained by withdrawing gases therefrom with a suitable fan connected to the chamber by a duct 29. The forming conveyor 26 moves at a constant speed through the bottom of the collecting hood carrying the collected mat of fibers therefrom.

As the glass flows from the orifices in the bottom of the feeder it is attenuated into fine fibers by the steam from the blowers. These fibers gradually cool because of the radiation of heat therefrom and the conduction of heat to the surrounding attenuating gases. Most glasses continue to have a non-crystalline or amorphous structure after cooling and are sometimes referred to as super-cooled liquids. As these glasses or super-cooled liquids are heated they undergo a reversible change wherein their viscosity gradually decreases and they change from what appears to be a solid state into a more nearly fluid condition and finally into a state that corresponds to the ordinary concept of a liquid. Even after being heated so that they are quite fluid their viscosity is dependent upon their temperature and decreases as their temperature increases. This gradual softening or continual reduction in the viscosity of the glass is a very useful property and permits it to be readily attenuated or molded into the great variety of shapes that are now used for a tremendous number of everyday applications. For the purposes of this application, this sloping viscosity curve of the glass is divided into three broad ranges. At the hot or fluid end of the viscosity curve the glass is quite fluid and flows quite readily. Toward the cooler end of this section of the curve is the fiber forming range at which the glass is still readily deformable and flows readily but yet has sufficient integrity that it will tend to remain as a solid mass and thus can be attenuated into fibers.

As the glass cools still further it enters the second range of viscosity which is the most critical range for the purposes of this invention. In this range the glass has cooled sufficiently that it is what might be called a semi-solid. That is it has sufficient integrity that it will maintain its shape as a fiber but still can be rather easily deformed. When the glass is in this range of viscosity it is deformable by outside forces but will not flow, nor does it possess sufficient elastic memory to return to its original shape after being deformed. According to this invention the glass fibers are curled while they have a viscosity corresponding to this semi-solid state and are cooled and set in the curled condition. The third and most viscous or cooled state is the condition normally thought of when reference is made to glass. It is that state at which the glass has all the properties of a solid, including resistance to deformation and elastic memory.

During the formation of glass fibers, glass is at different times in all three of these ranges of viscosities. It begins and flows through the orifices in the feeder while in a fluid state. The fluid glass is contacted and attenuated into fine fibers by the attenuating steam from the blowers 24. While in the attenuating steam is passes from the fluid state into the semi-solid state and ultimately into the solid state. It has been discovered that such steam blown fibers can be curled by introducing a plate or other curling surface 30 into the stream of fibers and attenuating gases to disrupt their smooth flow while the glass is still in a semi-solid state.

Such curling of the glass fibers is believed to result from a combination of many factors. These include a slowing down of their forward movement, an impinging of the glass fibers against the curling surface, an abrupt change in their direction of movement, and an arcuate redirectioning or curling of the semi-solid fibers by the turbulence of the attenuating gases resulting from the disruption in their movement occasioned by the plate. The fibers are then cooled in the curled condition. The semi-solid glass fibers moving in the stream of attenuating gases are slowed down and compressed in the region of the curling surface causing them to assume a randomly curled condition. It appears that the lowermost portion of the moving semi-solid fiber enters a region of slower moving gases around the staionary surface and loses speed. Then the momentum of faster moving dramatically opposite or rear portions of the fiber, and attenuating gases therearound, effect a longitudinal compression of the semi-solid fiber. Because of the relatively high viscosity of the glass the fibers will maintain their integrity as such under the influence of these compressive forces. However, while in this semi-solid state these longitudinal compressive forces will effect a rather tight, random curling of the fiber and sequent cooling will solidify it in this curled condition. This compressive action on the fiber is greatly increased if the semi-solid fibers impinge against the stationary curling surface because of the more positive slowing of the downward movement of the fibers. This impinging of the fibers against the deflecting or curling surface results in a piling up of the individual fibers in a curled condition. While the fibers are piling in this curled condition, they are simultaneously swept from the curling surface into the open collecting hood by the attenuating gases flowed around them. Further, the turbulent swirling of these gases as they are deflected from the curling surface, blends and twists the semi-solid deformable glass fibers further, thereby increasing the curliness of the fibers.

The fibers do not have to contact the curling plate in order to be curled. If they are deflected sharply by following the attenuating gases when they are deflected by the curling surface, they will be deformed into curls almost as tight as if they had struck the plate. This curling without contacting the plate seems to result in a sharp bending under the influence of the turbulent gases above the plate as well as from a sharp bending near the plate when following the gases thereacross. This sharp redirecting of the semi-solid fibers and creating this turbulent zone of gases that twists and turns the semi-solid fibers into the curled condition can also be accomplished by using a gaseous jet directed somewhat opposite the direction of movement of the fibers. The interaction of the attenuating gases and the gases from this jet will create a zone of turbulence into which the freshly attenuated, semi-solid fibers flow.

The preferred location of the deflecting surface is dependent upon characteristics of the fibers to be curled and upon the amount of curl desired in the fibers. Factors to be considered are: the type of glass being fiberized, the diameter of the fibers, the temperature of the gas as it flows through the orifices in the feeder, and the tempearture of the attenuating gases. Thus, a deflecting plate positioned to curl relatively thick fibers, such as are used to make filters, may have no effect upon the characteristics of thinner fibers normally used in the manufacture of fibrous glass thermal insulation because the finer will no longer be in the semi-solid state, but cool sufficiently rapidly that they will have acquired an elastic memory and are no longer readily deformable. This difference in operating characteristics results from a slower rate of heat dissipation from the thicker fibers whereby they remain in a semi-solid state for a longer period of time.

It has also been found that the degree of curliness imparted to the fibers is dependent upon the angle of incidence of the fibers to the deflecting plate. When the fibers are directed to the plate at a glancing angle only a slight curl is imparted thereto, and when the deflecting plate is nearly perpendicular to the path of the fibers, the maximum amount of curl is imparted to them. By varying the angle of incidence of the fibers against the deflecting plate, fibrous glass mats containing fibers with various degrees of curl is produced. Accordingly, by properly programming the oscilation of the deflecting plate the characteristics of the mat can be controlled by incorporating therein the most desirable mixture of fibers with various degrees of curl to produce a mat having characteristics most suited to particular end use requirements.

If necessary, a stream of gases from a suitable supply source (not shown) can be blown across the face of the deflecting plate to cool it and assure that the fibers do not stick thereto. These gases wiping across the face of the deflecting plate blow the fibers therefrom. Also, by circulating a cooling fluid behind the curling surface, the temperature of its face can be maintained low enough to substantially reduce the tendency of the glass fibers to stick thereto. The cooled face will also help solidify the curled fibers by absorbing heat therefrom when they contact the plate.

A suitable binder such as a phenol-formaldehyde resin is sprayed into the collecting hood 25 through spray guns 31 to adhere the fibers together as a loose mat. A solidably mounted roller 32 seals the edge of the collecting hood thereby preventing the inspiration of air from the surrounding room into the collecting hood. The roller also partially compacts the fibrous glass mat and assures that it does not exceed the desired thickness. After the fibrous mat leaves the collecting hood it is passed to a second conveyor 34 which transports it through a curing oven 35. Hot air passing through the mat in the oven induces a reaction in the mate binder resulting in a solidification or curing thereof to promote a tight adherence of the fibers to one another to form an integral mat. After the mat passes from the curing oven 35, a suitable dust catching oil or adhesive 36 is sprayed thereon from a spray gun 37 if the mat is to be used as filtering media. Other aftertreatments may also be utilized to prepare the mat for other specialized end uses. Subsequently, the mat can be cut into predetermined sections by a cutter 38. Cut sections of mat are then rolled and sealed for shipment or placed on storage pallets 39 preparatory to future treatment and packaging.

Figure 2:
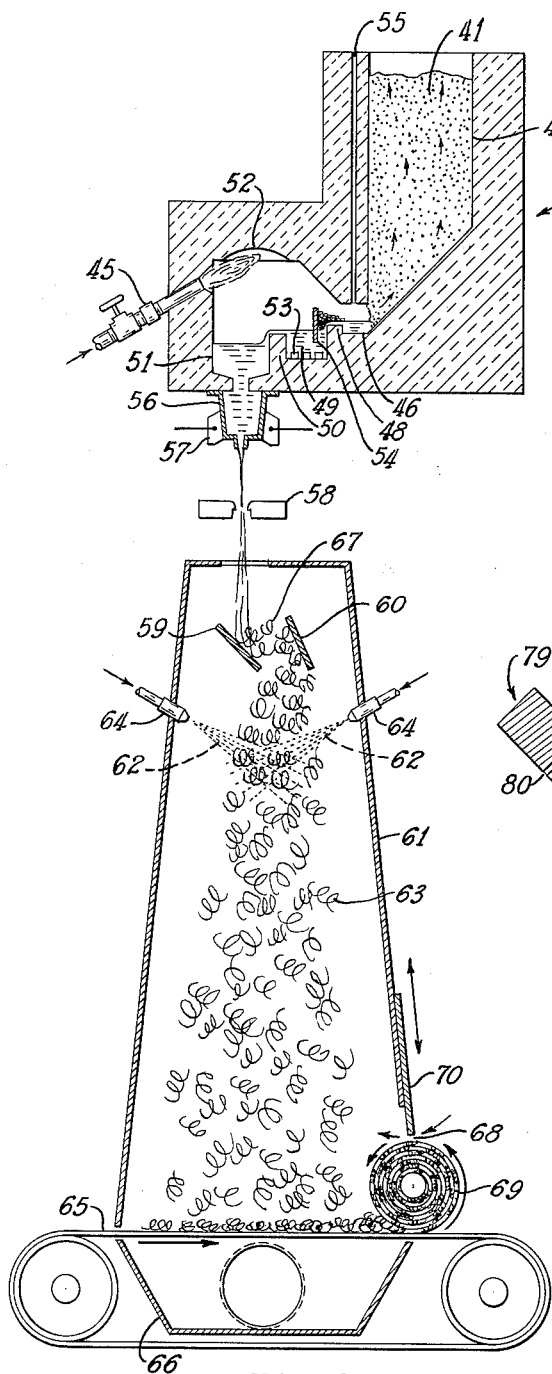
FIGURE 2 is a side sectional view of a process for producing curly fibers and for imparting additional curl to the fibers as they are produced.

Referring to FIGURE 2, raw batch materials 41 are fed into the batch storage section 42 of the melting furnace 44. This batch is melted at the lower end of the batch storage section and flows into a melting section 46 located between a weir 48 and the melting batch. The molten glass flows from the melting section 46 over the weir 48 and enters the primary refining section 49 where it remains until it is thoroughly melted and homogenized at which time it passes over a second weir 50 into a storage section 51 above the bushing. A gas burner 45 heats the furnace and melts the glass. The hot combustion products from the burner pass upward into the furnace and are deflected downward toward the melting glass by the dome shaped furnace top 52. The hot combustion gases impinging upon the dome shaped top of the furnace heat the top so that it radiates downward to supply heat to the melting glass. In operation the raw mixed batch materials 41 are fed through the top of the furnace to the batch storage section 42. These batch materials move downward through the storage section as the batch materials at the bottom are melted and converted into glass by the hot gases. The partially melted glass flows to a shallow melter section 46. As the glass builds up in this shallow melter section, some flows over the weir 48 as a thin film. The glass in flowing over the weir as a thin film is easily heated and well refined by the hot combustion gases flowing thereover as well by the heat radiated from the dome shaped top of the furnace. This large amount of heat refines the glass thoroughly thereby greatly improving its homogeneity. The molten material, after passing over the weir 48, enters the primary refining section 49. While in this primary refining section, heat is applied to the glass from the burner 45. Additional heat can be applied if desired by utilizing an electrical heating system and the electrodes 53. A skimmer block 54 is located in the primary refining section near the weir 48 to prevent the flowing of scum and foam from the melting section 46 over the entire surface of the primary melting section and confining it to the area adjacent the weir 46. The hot combustion gases escape from the furnace by flowing through the glass that is being melted thereby heating it by direct contact therewith. After passing through this melting glass these gases flow upward through the downwardly moving batch thereby preheating it so that only a small additional amount of heat need be added at the melting stage to convert it into glass. The vent 55 is a parallel escape route for these combustion gases and may be used to control the pressure within the melter.

The glass flows from the primary refining section 49 of the melting unit over a second control weir 50 into a storage section 51. The second weir 50 is positioned directly under the hot dome 52 so that the glass is subject to the full effect of the intense radiant heat therefrom to assure that all of the seed and stones in the glass are dissolved. A feeder 56 is positioned at the bottom of the storage section of the melting unit. This feeder is electrically heated by leads fastened to its terminals 57 to prevent its cooling and allowing the glass to solidify. The molten glass in fiber forming condition flows as streams from the feeder through a plurality of orifices in its bottom. Gases from blowers 58 positioned therebelow attenuate these streams of glass into fine fibers. Positioned beneath the blowers are curling plates 59 and 60. The fibers strike the curling plate 59 and are deflected and curled as discussed in reference to FIGURE 1. It has been found that additional curl can be imparted to these fibers by placing a second curling plate 60 in a position such that it will be struck by the fibers being deflected from the first curling plate 59. The semi-solid fibers being attenuated by the gases from the blowers 58 are slowed down by their interaction with the curling plate 59 and longitudinally compressed and curled by the attenuation gases. These gases and the semi-solid fibers entrained therein bounce off the curling plate 59 into the plate 60. The curling plate 60 functions quite similarly to the plate 59 in that the already curled semi-solid fibers 67 are swept from the plate 59 by the attenuating gases only to be again slowed down by the plate 60 and additionally longitudinally compressed and curled by these same gases. This technique has been found to be especially useful wherein it is desired to curl fibers having rather large diameters because these large diameter fibers generally lose their heat quite slowly and therefore remain in a semi-solid curlable state for a sufficient length of time to permit them to be additionally curled by their interaction with the second curling surface. The rate at which these fibers lose heat is dependent upon their temperature, the particular characteristics of that composition, and the fiber daimeter. Thus, a thick fiber of a composition that loses its heat slowly can still be curled a rather large distance below the bushing and additional curl may be imparted thereto by bouncing the fiber between two and perhaps three of four curling plates before it has cooled sufficiently that subjecting it to additional curling action by the gases will not effect additional curl. These curled fibers 63 are collected together in a collecting hood 61 on a suitable foraminous conveyor 65. Binder 62 is sprayed into the collecting hood from spray guns 64 to coat the fibers to aid in adhering them one to another. A suction box 66 located below the forming conveyor exhausts gases from the forming hood. The foraminous collecting conveyor 65 carries the fibrous mat from the collecting hood. Because of the negative pressure that is maintained within the collecting hood, gases from the surrounding room rush into the hood through the opening 68 above the mat. By maintaining a proper balance between the negative pressure in the hood, the height of the opening 68 and the stiffness of the fibrous mat, is possible to effect a rolling of the mat onto itself and the formation of a loose roll 69 from the fibrous glass mat. A gate 70 is provided to regulate the flow of gases through the opening 68 so that a continual rolling of the mat will occur. If desired a curved plate (not shown) can be placed adjacent the conveyor 65 to assist the starting and maintaining of this rolling action. When the desired quantity of mat has been collected in the roll it is severed from the mat and a new roll starts automatically.

Figure 3:
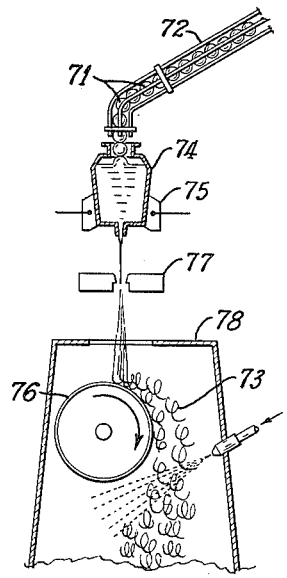
FIGURE 3 is a side elevation view of apparatus for producing curled fibers wherein the curling mechanism is rotated to prevent hanging up of fibers thereon.

FIGURE 3 illustrates another process for curling fine glass fibers wherein glass marbles 71 are fed from a suitable supply source (not shown) through a conveying duct 72 to an electrically heated glass feeder 74. Power is supplied to this feeder through terminals 75 attached to the feeder. The glass marbles 71 are melted in the feeder and the molten glass flows therefrom through orifices in its bottom section. This molten glass is attenuated by the gaseous blowers 77 utilizing an expanding gas such as superheated steam under pressure. These fibers, while they are still in a plastic deformable or semi-solid state, are deflected and curled by a revolving drum 76 positioned within a collection hood 78. This revolving drum functions quite similarly to the curling plates illustrated in FIGURES 1 and 2. The individual semi-solid fibers are piled up in a curled condition because of their decrease in speed occasioned by their interaction with the curling drum and cooled in that condition. The curled fibers 73 are carried from the curling drum by the attenuating gases while they are cooling. However, the tendency for the fibers to adhere to the curling surfaces is reduced because of the constant rotation of the curling drum. Gravity will tend to pull many of the fibers from the curling drum when it has rotated far enough that they are suspended therefrom. In addition, if the curling drum is rotated at a high rate the fibers will be thrown therefrom by centrifugal force. A somewhat similar result can be obtained by rotating the curling plate 30 shown in FIGURE 1 to throw the curled fibers therefrom. In addition, a mat containing fibers of varying curl will be produced because the number of fibers curled and the tightness of the curl will vary from nearly none when the curling plate is aligned parallel to the flow of the fibers, to a tight curl in a large percentage of the fibers when the curling plate is aligned perpendicular to the flow of the fibers.

Figure 4:
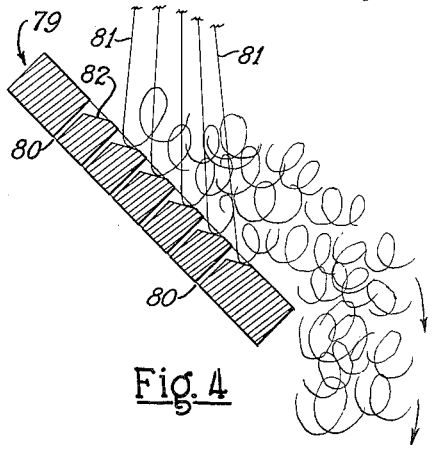
FIGURE 4 is a side view on an enlarged scale of a foraminous plate used for curling the fibers.

The fibers being attenuated are essentially entrained in the attenuating gases which will tend to flow as a thin layer or curtain of gases moving at high speeds adjacent the curling surface. The semi-solid fibers will not be prone to pierce this layer of gases but will tend to bend and follow the flow of air down to and across the surface. This movement of the gases across the surface of the curling plate will decrease its curling efficiency because the fibers will tend not to be slowed down as sharply or as readily piled up in a curled condition by the plate and will therefore not be easily curled. This decrease in curling efficiency because of the wiping effect on the plate by the attenuating gases is more pronounced with thin light fibers than it is with the thicker fibers such as those that are used for producing filters because the thicker fibers will have greater downward momentum and will therefore more readily pierce this layer of gases. By utilizing a foraminous curling plate 79, as illustrated in FIGURE 4, this wiping of the attenuating gases across the curling surface can be substantially reduced. The attenuating gases will not wipe across the surface of the curling plate but will pass through the openings therein. The semi-solid fibers 81 will tend to follow the attenuating gases and impinge against the curling plate thereby coming to an abrupt halt and pile up in curled condition against the plate. The size of the holes in the curling plate are controlled so that they are not so large that the fibers will stick therein but are large enough to permit sufficient gases to flow therethrough that the fine fibers will be curled. By chamfering the edges 82 of the openings in the curling plate the tendency of the glass fibers to penetrate into the openings and stick can be substantially reduced or eliminated. These chamfers are preferably cut to such a depth that the openings in the plate will be completely protected from the impinging glass fibers by their upper edge. In other words, to the fibers moving toward the plate it appears to be a solid wavy plate with no openings therein because all of the openings are hidden by their overlapping upper edges. However, the chamfer should also be cut so as to force the fibers hitting it away from the opening and toward the lower edge of the plate. With a plate cut in this manner and with other types of wavy curling plates, fibers with a variety of degrees of curl will be obtained because the angle of incidence between the semi-solid fiber and the curling will vary depending upon the portion of the plate that the fiber hits.

It is apparent, that within the scope of this invention modifications in different arrangements may be made other than is herein disclosed and the present disclosure is illustrative merely, the invention comprehending all variations thereof.

We claim:

1. A process for producing curly fibers of heat softenable mineral material comprising supplying molten fiber forming material in the form of streams from an orificed feeder, engaging said molten streams and attenuating them into fibers with gaseous blasts of a blower below said feeder, moving said fibers and the gases of said blasts against a hard deflection surface disposed in their path, controlling the temperature of said streams and correspondingly the viscosity of said streams so that when said fibers reach said deflection surface they are in a semi-solid condition whereupon the redirectioning of the gases at said surface and the deflection of fibers therefrom imparts a curled condition to said semi-solid fibers, and then solidfying said curled fibers.

2. A process for curling glass fibers comprising flowing streams of glass from a molten source, engaging said molten streams with a gaseous blast and attenuating said streams into fibers, deforming said fibers by moving them with gas of said blast against a deflection surface disposed across their path, controlling the temperature of said streams and correspondingly the viscosity of said streams such that when the fibers impinge the deflection surface they are in a semi-solid condition, redirecting said gas and deflecting said fibers from said surface and correspondingly deforming said semi-solid fibers, and then cooling said fibers whereby they are solidified in their deformed curled condition.

3. The process of claim 2 wherein the deflection surface against which the fibers are moved is the surface of a rotatable member and the member is rotated as the fibers move against said surface.

4. The process of claim 2 wherein before solidification and while in said curled semi-solid condition, the fibers are deflected from a second surface to impart additional curl thereto.

(References on following page)

References Cited by the Examiner

UNITED STATES PATENTS

| | | | |
|---|---|---|---|
| 2,048,651 | 7/1936 | Norton | 65—5 |
| 2,132,702 | 10/1938 | Simpson | 65—9 X |
| 2,189,822 | 2/1940 | Thomas et al. | 65—5 |
| 2,313,630 | 3/1943 | Dockerty | 65—6 |
| 2,515,738 | 7/1950 | Slayter et al. | 65—16 |
| 2,708,813 | 5/1955 | Bourgeaux | 65—2 |
| 2,927,621 | 3/1960 | Slayter et al. | 65—9 |
| 2,981,999 | 5/1961 | Russell | 65—9 X |

FOREIGN PATENTS 475,406   11/1937   Great Britain.

DONALL H. SYLVESTER, *Primary Examiner.*

MICHAEL V. BRINDISI, *Examiner.*